US012128956B2

(12) United States Patent
Alwan et al.

(10) Patent No.: US 12,128,956 B2
(45) Date of Patent: Oct. 29, 2024

(54) VEHICLE HAVING UNIBODY ARCHITECTURE AND DUAL KICKUP CROSS MEMBERS FOR SIDE LOAD PATHS

(71) Applicant: Ford Global Technologies, LLC, Dearborn, MI (US)

(72) Inventors: Jamil M. Alwan, Ann Arbor, MI (US); Djamal Eddine Midoun, Ann Arbor, MI (US); Sean Timothy Ryan, Farmington Hills, MI (US); Peyman Aghssa, Ann Arbor, MI (US); Zakareia H. Hussain, Shelby Township, MI (US); Stephen William Gallagher, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 17/843,115

(22) Filed: Jun. 17, 2022

(65) Prior Publication Data

US 2023/0406412 A1   Dec. 21, 2023

(51) Int. Cl.
*B62D 25/20* (2006.01)
*B62D 23/00* (2006.01)
*B62D 27/02* (2006.01)
*B62D 33/02* (2006.01)

(52) U.S. Cl.
CPC ....... *B62D 25/2027* (2013.01); *B62D 23/005* (2013.01); *B62D 27/023* (2013.01); *B62D 33/02* (2013.01)

(58) Field of Classification Search
CPC .... B62D 23/005; B62D 27/023; B62D 33/02; B62D 25/025; B62D 25/08; B62D 25/20; B62D 25/2027; B62D 25/2036
USPC ................... 296/193.07, 8, 204, 209, 29, 30
See application file for complete search history.

(56) References Cited

U.S. PATENT DOCUMENTS

| | | | |
|---|---|---|---|
| 8,960,776 B2* | 2/2015 | Boettcher | B62D 25/20 296/29 |
| 9,789,907 B2 | 10/2017 | Yang et al. | |
| 2018/0126835 A1* | 5/2018 | Saeki | B60N 2/005 |

FOREIGN PATENT DOCUMENTS

| | | |
|---|---|---|
| FR | 3091846 | 7/2020 |
| JP | 2005170076 | 6/2005 |

* cited by examiner

*Primary Examiner* — Dennis H Pedder
(74) *Attorney, Agent, or Firm* — Burris Law, PLLC

(57) ABSTRACT

A vehicle of unibody construction includes a left rail, right rail, first kickup member, and second kickup member. A left transition portion of the left rail extends inboard and upward from a left forward portion to a left rear portion. A right transition portion of the right rail extends inboard and upward from the right forward portion to the right rear portion. A left end of the first kickup member is coupled to the left forward portion and a right end of the first kickup member is coupled to the right forward portion. The second kickup member is rearward of the first kickup member. A left end of the second kickup member is coupled to at least one of the left forward and left transition portions. A right end of the second kickup member is coupled to at least one of the right forward and right transition portions.

20 Claims, 7 Drawing Sheets

VEHICLE HAVING UNIBODY ARCHITECTURE AND DUAL KICKUP CROSS MEMBERS FOR SIDE LOAD PATHS

FIELD

The present invention relates to unibody vehicles having structural cross members for side load paths.

BACKGROUND

The statements in this section merely provide background information related to the present disclosure and may not constitute prior art.

Modern passenger vehicles typically utilize a unibody architecture instead of a body on frame architecture. Typical unibody vehicles have a single kickup cross-member that structurally couples the left rocker panel to the right rocker panel to provide a side load path therebetween and transition the floor of the vehicle from the footwell to a second, higher elevation where the seats are mounted. The floor is typically made of a sheet metal material of less than 0.7 millimeters thick. In typical unibody vehicles, the trunk of the vehicle is substantially at the same height elevation as the rear seats and does not extend very far rearward of the seats. However, in typical trucks (e.g., pickup trucks), the truck bed is substantially higher than the rear seats and extends substantially further rearward. Additionally, trucks typically experience different loads and stresses than a typical passenger vehicle. As such, most trucks use a body on frame architecture and vehicle designers have generally avoided trucks with unibody architecture.

The teachings of the present disclosure provide for a vehicle with a unibody architecture that may be used with both passenger vehicles and trucks while overcoming these and other issues with unibody architecture.

SUMMARY

This section provides a general summary of the disclosure and is not a comprehensive disclosure of its full scope or all of its features.

In one form according to the teachings of the present disclosure, a vehicle of unibody construction includes a unibody structure that includes a left rail, a right rail, a first kickup member, and a second kickup member. The left rail includes a left forward portion, a left rear portion, and a left transition portion. The left rear portion is higher than the left forward portion and inboard of the left forward portion. The left transition portion extends inboard and upward from the left forward portion to the left rear portion to connect the left forward portion to the left rear portion. The right rail includes a right forward portion, a right rear portion, and a right transition portion. The right rear portion is higher than the right forward portion and inboard of the right forward portion. The right transition portion extends inboard and upward from the right forward portion to the right rear portion to connect the right forward portion to the right rear portion. A left end of the first kickup member is coupled to the left forward portion and a right end of the first kickup member is coupled to the right forward portion. The second kickup member is rearward of the first kickup member. A left end of the second kickup member is coupled to at least one of the left forward portion and the left transition portion. A right end of the second kickup member is coupled to at least one of the right forward portion and the right transition portion. According to a variety of alternative forms, which may be used individually or in any combination thereof: the first kickup member is located at a position in the vehicle where a floor of the vehicle transitions from a first elevation to a second elevation, the second elevation being higher than the first elevation, wherein the second kickup member is located a position in the vehicle where the floor of the vehicle transitions from the second elevation to a third elevation, the third elevation being higher than the second elevation; the vehicle is a truck and the third elevation includes a truck bed of the vehicle; the first elevation includes a footwell of a passenger compartment and a seat of the vehicle is supported at the second elevation; the footwell is a rear footwell and the seat is a rear seat of the vehicle; vehicle is a truck and the third elevation includes a truck bed of the vehicle; the unibody structure further includes a left rocker panel and a right rocker panel, wherein the left end of the first kickup member is welded to the left rocker panel and to the left forward portion, wherein the right end of the first kickup member is welded to the right rocker panel and to the right forward portion; the left end of the second kickup member is welded to the left forward portion, wherein the right end of the second kickup member is welded to the right forward portion; the left end of the second kickup member is welded to the left transition portion, wherein the right end of the second kickup member is welded to the right transition portion; the left end of the second kickup member is welded to the left transition portion, wherein the right end of the second kickup member is welded to the right transition portion; the left forward portion is substantially parallel to the right forward portion, wherein the left rear portion is substantially parallel to the right rear portion; the left transition portion is wider in a lateral direction of the vehicle proximate the left forward portion than proximate the left rear portion, wherein the right transition portion is wider in the lateral direction of the vehicle proximate the right forward portion than proximate the right rear portion; the left transition portion is wider in a vertical direction of the vehicle proximate the left forward portion than proximate the left rear portion, wherein the right transition portion is wider in the vertical direction of the vehicle proximate the right forward portion than proximate the right rear portion; the left transition portion is wider in a vertical direction of the vehicle proximate the left forward portion than proximate the left rear portion, wherein the right transition portion is wider in the vertical direction of the vehicle proximate the right forward portion than proximate the right rear portion; the first kickup member and the second kickup member are each configured to provide a structural load path between the left and right rails; the left forward portion is coupled to a left rocker panel of the unibody structure and the right forward portion is coupled to a right rocker panel of the unibody structure; the first kickup member is formed of sheet metal of greater than or equal to 1.2 millimeter in thickness.

In another form according to the teachings of the present disclosure, a vehicle of unibody construction includes a unibody structure including a left rail, a right rail, a left rocker panel, a right rocker panel, a first kickup member, and a second kickup member. The left rail includes a left forward portion, a left rear portion, and a left transition portion. The left rear portion is higher than the left forward portion and inboard of the left forward portion. The left transition portion extends inboard and upward from the left forward portion to the left rear portion to connect the left forward portion to the left rear portion. The right rail includes a right forward portion, a right rear portion, and a right transition portion. The right rear portion is higher than the right forward portion and inboard of the right forward portion. The right transition portion extends inboard and upward from the right forward portion to the right rear portion to connect the right forward portion to the right rear portion. The left rocker panel is coupled to the left front portion and extends forward therefrom. The right rocker panel is coupled to the right front portion and extends forward therefrom. The first kickup member is located at a position in the vehicle where a floor of the vehicle transitions from a first elevation to a second elevation. The second elevation being higher than the first elevation. A left end of the first kickup member is welded to the left forward portion and a right end of the first kickup member is welded to the right forward portion. The second kickup member is rearward of the first kickup member and located at a position in the vehicle where the floor of the vehicle transitions from the second elevation to a third elevation. The third elevation being higher than the second elevation. A left end of the second kickup member is welded to the left forward portion and the left transition portion. A right end of the second kickup member is welded to the right forward portion and the right transition portion. The first and second kickup members are each configured to provide a structural load path between the left and right rails. According to a variety of alternative forms, which may be used individually or in any combination thereof: the left end of the first kickup member is welded to the left rocker panel and wherein the right end of the first kickup member is welded to the right rocker panel; the vehicle is a truck and the third elevation includes a truck bed of the vehicle, wherein the first elevation is a footwell of a passenger compartment of the vehicle and a seat of the vehicle is supported on the second elevation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
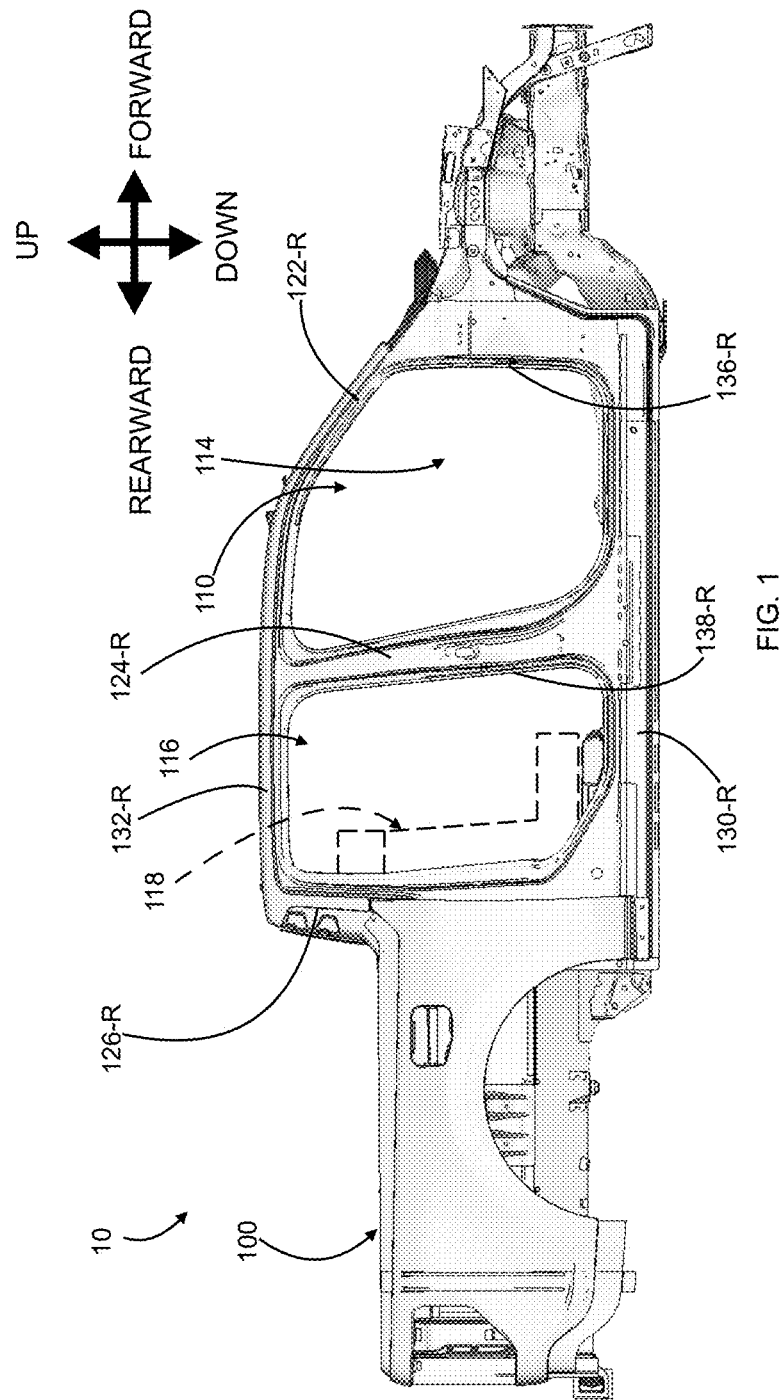
FIG. 1 is a side view of an example vehicle having a unibody structure in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a unibody structure 100 of an example vehicle 10 is illustrated. In the example provided, the vehicle 10 is a pickup truck, though other types of vehicles can be used, such as a Sport Utility Vehicle (SUV), van, sedan, or commercial vehicle for example. The unibody structure 100 defines a passenger compartment 110. In the example provided, the passenger compartment 110 includes a front region 114, wherein front seats (not shown) are located, and a rear region 116, wherein rear seats 118 (schematically represented in dashed lines) are located, though other configurations can be used.

In one alternative configuration, not specifically shown, the unibody structure 100 only has a front region with front seats and lacks the rear region or rear seats. In another alternative configuration, not specifically shown, additional rows of rear regions, such as for additional rows of rear seats, can be used.

Figure 2:
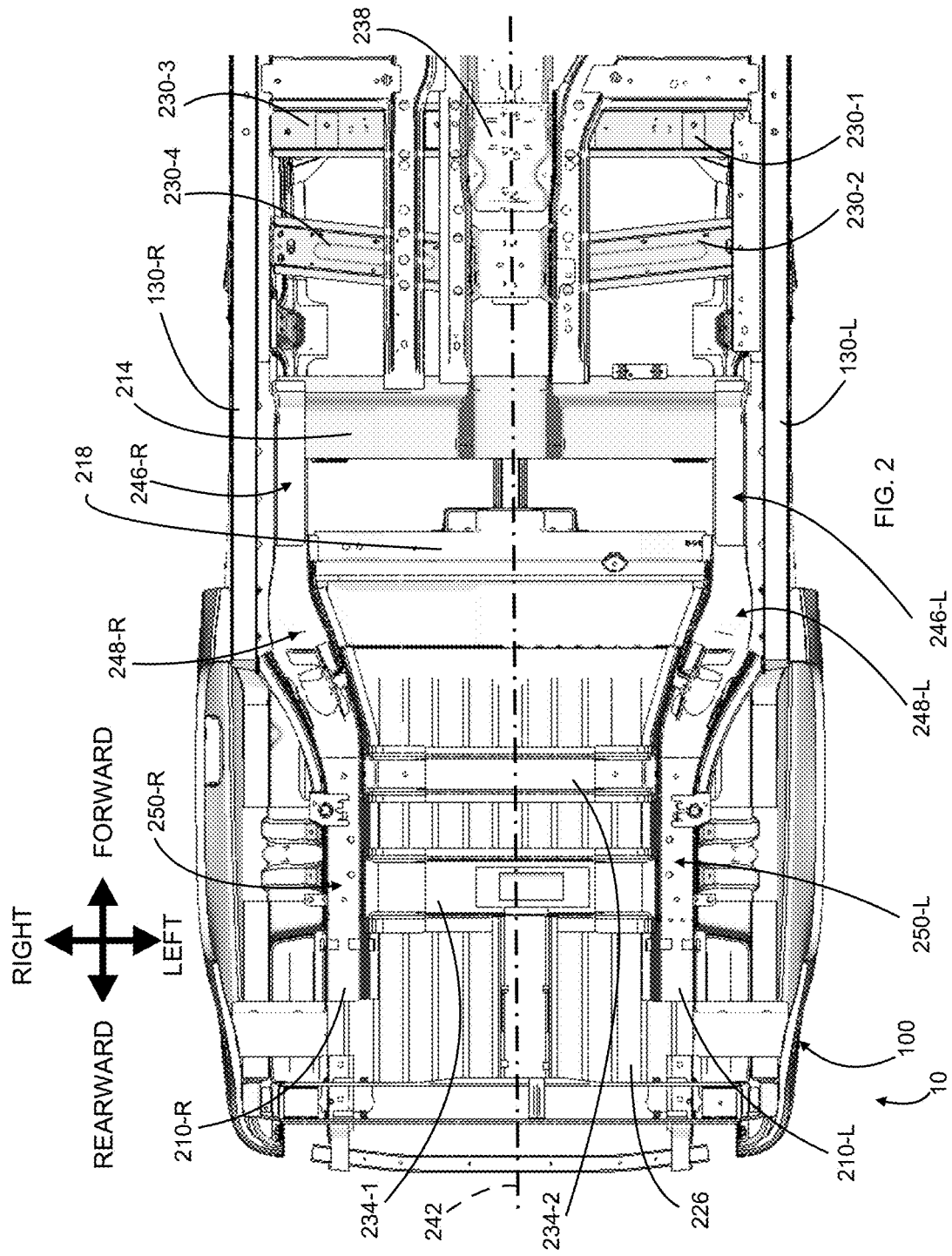
FIG. 2 is a bottom view of the vehicle of FIG. 1.
Figure 3:
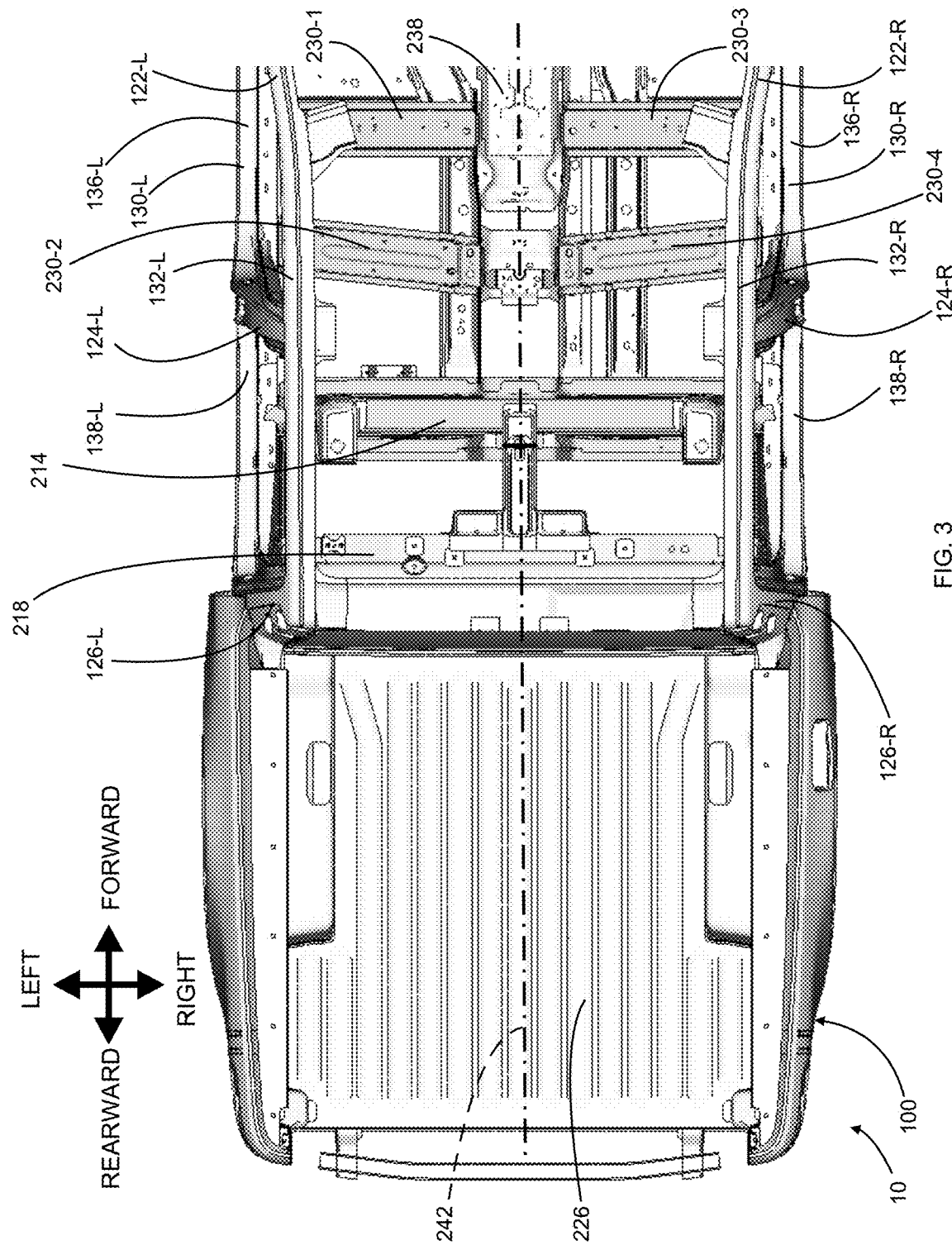
FIG. 3 is a top view of the vehicle of FIG. 1.

Referring to FIGS. 1-3, the unibody structure 100 includes a plurality of left pillars 122-L, 124-L, 126-L, a plurality of right pillars 122-R, 124-R, 126-R, a left rocker panel 130-L, a right rocker panel 130-R, a left header panel 132-L, and a right header panel 132-R. The pillars 122-L and 122-R are structural members and also referred to as left and right A-pillars, respectively. The pillars 124-L and 124-R are structural members and also referred to as left and right B-pillars, respectively. The pillars 126-L and 126-R are structural members and also referred to as left and right C-pillars, respectively.

The left and right rocker panels 130-L, 130-R are structural members. The right A-pillar 122-R, the right header panel 132-R, the right B-pillar 124-R, and the right rocker panel 130-R, cooperate to define a right front door aperture 136-R. The right B-pillar 124-R, the right header panel 132-R, the right C-pillar 126-R, and the right rocker panel 130-R, cooperate to define a right rear door aperture 138-R. Referring to FIG. 3, the left A-pillar 122-L, the left header panel 132-L, the left B-pillar 124-L, and the left rocker panel 130-L, cooperate to define a left front door aperture 136-L. The left B-pillar 124-L, the left header panel 132-L, the left C-pillar 126-L, and the left rocker panel 130-L, cooperate to define a left rear door aperture 138-L.

While the specific example illustrated includes the left and right C-pillars 126-L, 126-R, it is understood that the vehicle 10 may only have the A-pillars 122-L, 122-R and B-pillars 124-L, 124-R, such as in configurations where the rear door apertures 138-L, 138-R are omitted.

Referring to FIGS. 2 and 3, the unibody structure 100 further includes a left rear rail 210-L, a right rear rail 210-R, a first kickup cross-member 214 (also referred to as the first kickup member 214), a second kickup cross-member 218 (also referred to as the second kickup member 218), a first floor panel 222 (shown in FIG. 4), and a rear floor panel 226 that is higher than and rearward of the first floor panel 222. In the example provided, the rear floor panel 226 is a truck bed of the vehicle 10.

In the example provided, the unibody structure 100 may also include a plurality of structural forward cross-members (e.g., cross-members 230-1, 230-2, 230-3, 230-4, collectively referred to herein as forward cross-members 230) and a plurality of rear cross-members (e.g., cross-members 234-1, 234-2, collectively referred to as rear cross-members 234). The example vehicle 10 is a rear drive vehicle such that the unibody structure 100 also includes a drive shaft tunnel 238 that runs longitudinally along a central axis 242 of the vehicle 10, though other configurations can be used, such as front drive vehicles without a drive shaft tunnel.

In the example provided, the forward cross-members 230-1 and 230-2 extend from the left rocker panel 130-L to the drive shaft tunnel 238 and the forward cross-members 230-3 and 230-4 are aligned with the forward cross-members 230-1 and 230-2 and extend from the right rocker panel 130-R to the drive shaft tunnel 238 to provide lateral structural strength. In configurations where the drive shaft tunnel 238 is omitted, forward cross-members can extend fully from the left rocker panel 130-L to the right rocker panel 130-R.

Figure 4:
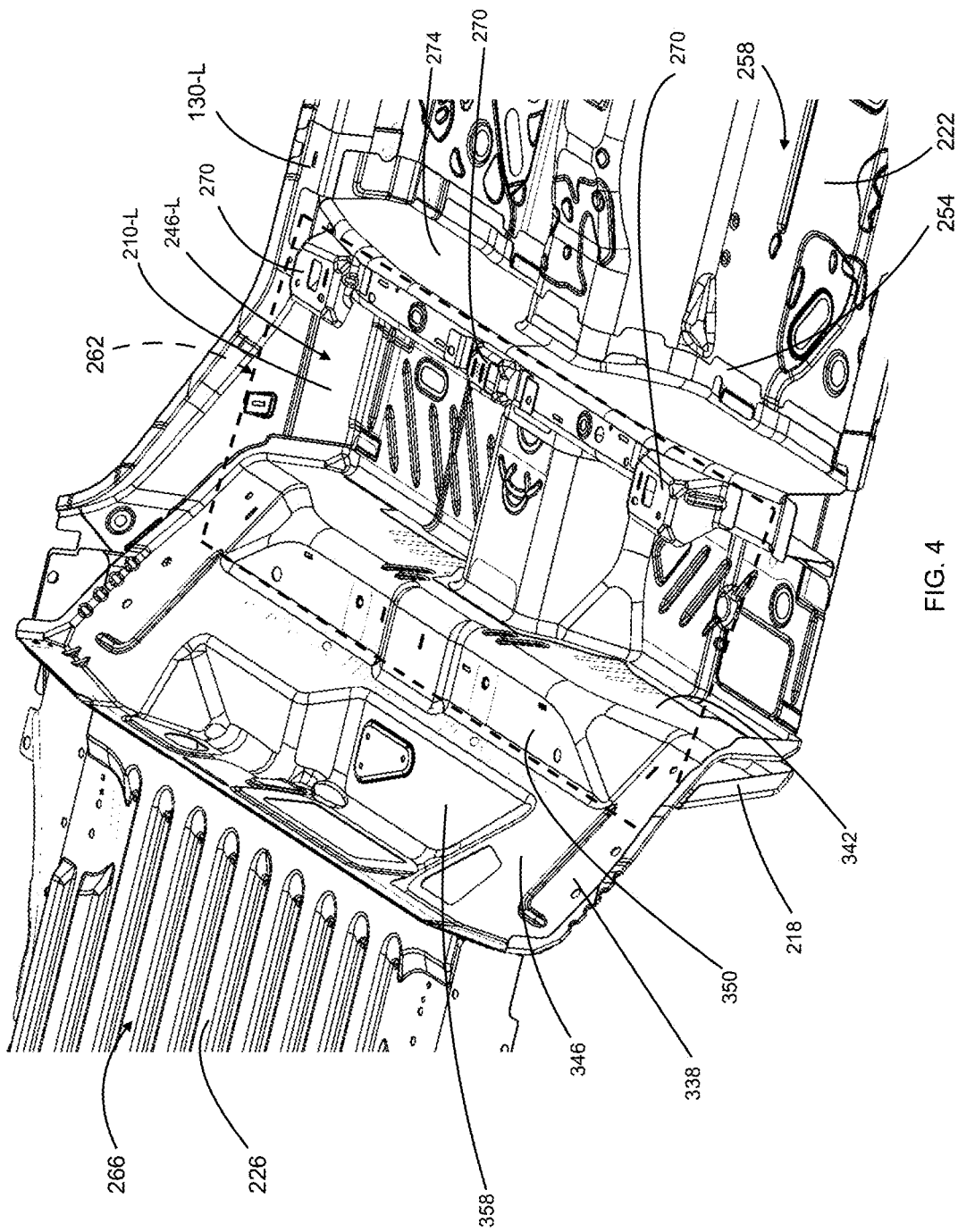
FIG. 4 is a top perspective view of a portion of the unibody structure of FIG. 1.

In the example provided, the forward cross-members 230 are located above the first floor panel 222 (FIG. 4) and are welded to the top of the first floor panel 222 (FIG. 4). In the example provided, the first floor panel 222 (FIG. 4) is stamped sheet metal that spans laterally from the left rocker panel 130-L to the right rocker panel 130-R and defines a portion of the drive shaft tunnel 238 and may be one piece of sheet metal or more than one piece of sheet metal welded together. The forward cross-members 230 can be positioned such that the front seats (not shown) may be mounted to and supported by the forward cross-members 230.

As best shown in FIG. 2, the left rear rail 210-L is a structural member that includes a forward portion 246-L, a transition portion 248-L, and a rear portion 250-L. The left rear rail 210-L may be formed of a plurality of stamped sheet metal pieces welded together or may be a single piece of stamped sheet metal. In the example provided, at least the left rear portion 250-L and the left transition portion 248-L are formed of one or more sheet metal pieces that are stamped into a generally U-shaped cross-sectional shape, though other configurations can be used. The forward portion 246-L may also be stamped into a generally U-shaped cross-sectional shape, though other shapes may be used, such as the generally L-shaped cross-sectional shape illustrated.

The right rear rail 210-R is similar to the left rear rail 210-L, except mirrored across the central axis 242 of the vehicle 10. As such, only the left rear rail 210-L is described in detail herein for brevity. As such, features of the right rear rail 210-R are indicated in the figures with similar reference numbers as the left rail 210-L except ending in "-R" instead of "-L", e.g., right forward portion 246-R, right transition portion 248-R, and right rear portion 250-R.

The left forward portion 246-L is forward of the left transition portion 248-L. The left transition portion 248-L is forward of the left rear portion 250-L and joins the left forward portion 246-L to the left rear portion 250-L. The left forward portion 246-L is coupled to (e.g., welded to) the left rocker panel 130-L. The left rocker panel 130-L extends forward of the left forward portion 246-L. The left rear portion 250-L is inboard of the left forward portion 246-L. The left transition portion 248-L angles inboard from the left forward portion 246-L to the left rear portion 250-L to connect the left rear portion 250-L to the left forward portion 246-L.

The left forward portion 246-L may be substantially parallel to the left rocker panel 130-L and the central axis 242. The left rear portion 250-L may also be substantially parallel to the central axis 242. The left forward portion 246-L may be narrower in the lateral direction (i.e., left and right directions) than the left rear portion 250-L. The left transition portion 248-L may have a wider region that is wider in the lateral direction than the left forward portion 246-L and the left transition portion 248-L tapers in width down from the wider region to the width of the left forward portion 246-L as the left transition portion 248-L approaches and joins the left forward portion 246-L. The left transition portion 248-L may taper down from the wider region to the width of the left rear portion 250-L as the left transition portion 248-L approaches and joins the left rear portion 250-L. In other words, the left transition portion 248-L may taper in lateral width in the forward and rearward directions.

Figure 5:
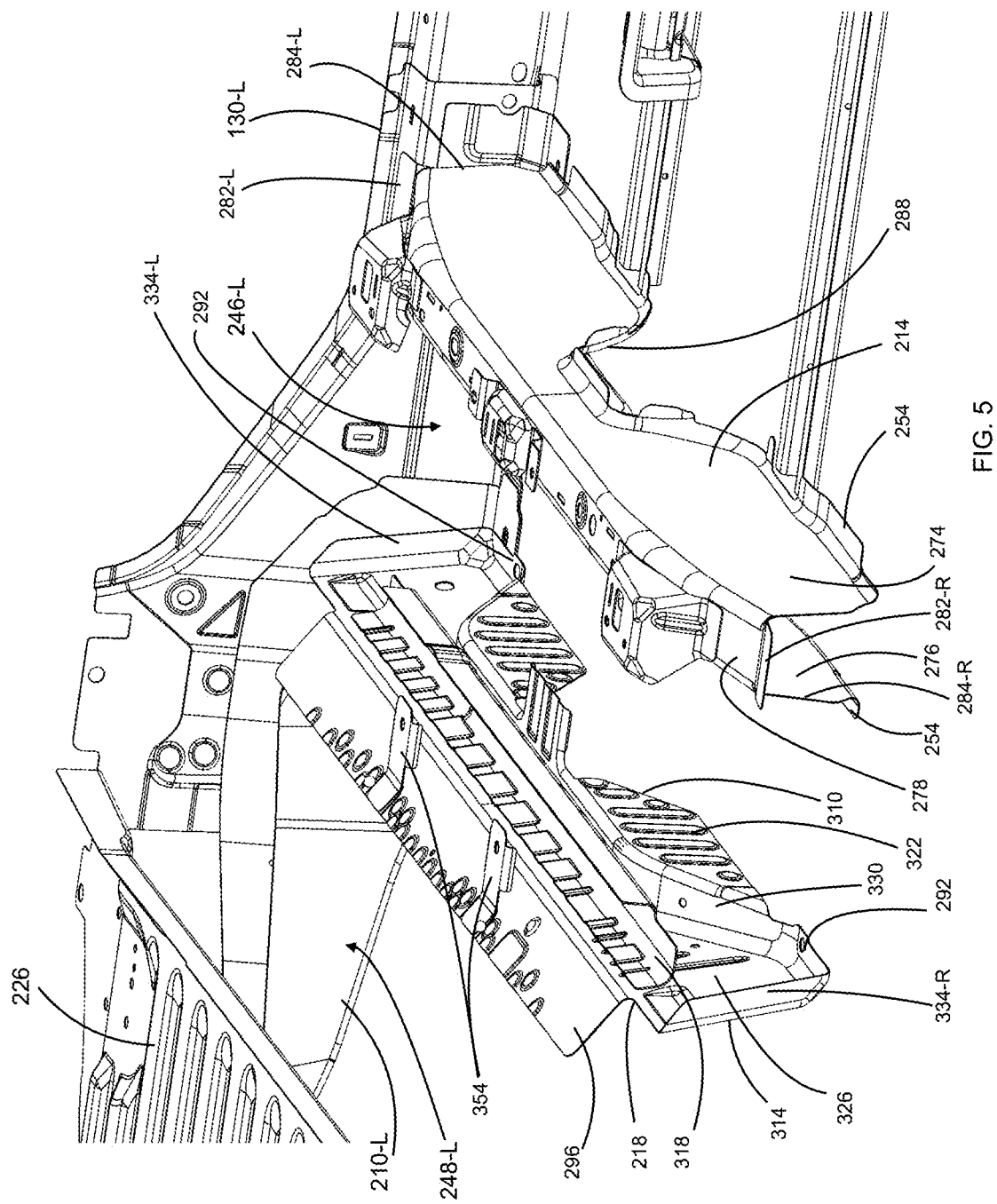
FIG. 5 is a top perspective view of the unibody structure of FIG. 1, similar to FIG. 4, but illustrated with a transitional floor panel removed to better show a second kickup member in accordance with the teachings of the present disclosure.
Figure 6:
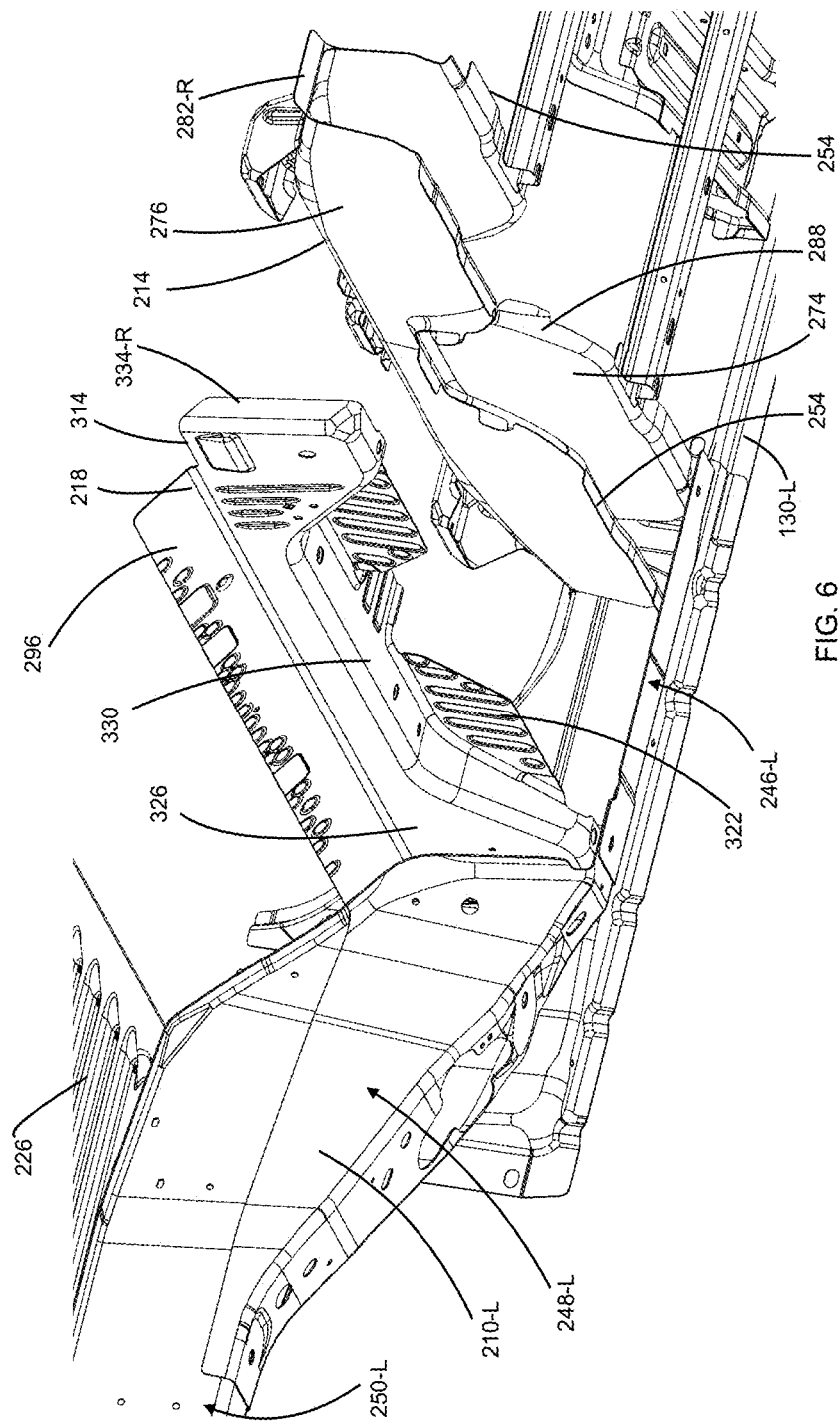
FIG. 6 is a bottom perspective view of the portion of the unibody structure of FIG. 5.

As best shown in FIGS. 5 and 6, the left rear portion 250-L is higher than the left forward portion 246-L. The left transition portion 248-L may have a thicker region that is thicker in the vertical direction (i.e., up and down directions) than the left forward portion 246-L and the left transition portion 248-L tapers in height down from the thicker region to the thickness of the left forward portion 246-L as the left transition portion 248-L approaches and joins the left forward portion 246-L. The left transition portion 248-L may taper down from the thicker region to the thickness of the left rear portion 250-L as the left transition portion 248-L approaches and joins the left rear portion 250-L. In other words, the left transition portion 248-L may taper in vertical thickness in the forward and rearward directions.

The rear cross-members 234 are structural members that span laterally between the left and right rear portions 250-L, 250-R and are coupled to (e.g., welded to) the left and right rear portions 250-L, 250-R to provide lateral structural strength therebetween. The rear floor panel 226 is coupled to (e.g., welded to) the tops of the left and right rear portions 250-L, 250-R to be supported thereby. The rear floor panel 226 may extend forward and be supported by part of the left and right transition portions 248-L, 248-R.

Referring to FIGS. 2-4, the first kickup member 214 is a structural member that spans laterally between and is coupled to (e.g., welded to) the left and right forward portions 246-L, 246-R and/or the left and right rocker panels 130-L, 130-R to provide lateral structural strength and a lateral load path therebetween.

In one form, the left end of the first kickup member 214 is coupled to (e.g., welded to) the left forward portion 246-L and the right end of the first kickup member 214 is coupled to (e.g., welded to) the right forward portion 246-R. The left end of the first kickup member 214 may also be coupled to (e.g., welded to) the left rocker panel 130-L and the right end of the first kickup member 214 may also be coupled to (e.g., welded to) the right rocker panel 130-R.

The first kickup member 214 can be located in the longitudinal direction of the vehicle 10 between the rear most pillars and the next pillars forward. In the example provided, the first kickup member 214 is positioned rearward of the B-pillars 124-L, 124-R and forward of the C-pillars 126-L, 126-R. In other words, the first kickup member 214 may be aligned in the longitudinal direction with the rear door apertures 138-L, 138-R.

Referring to FIGS. 4-6, the bottom of the first kickup member 214 is coupled to (e.g., welded to) the first floor panel 222. In the example provided, the bottom of the first kickup member 214 includes a plurality of flanges or tabs 254 that are welded to the first floor panel 222. The first floor panel 222 defines a first floor elevation 258. In the example provided, the first floor elevation 258 is the footwell of the rear seats 118 (FIG. 1). The first kickup member 214 extends upward from the first floor panel 222 to a second floor elevation 262 (indicated in dashed lines in FIGS. 4 and 7). The second floor elevation 262 is higher than the first floor elevation 258 and lower than a third floor elevation 266 that is defined by the rear floor panel 226.

Seats of the vehicle (e.g., the rear seats 118 shown in FIG. 1) can be mounted to the top of the first kickup member 214, such as by brackets 270 attached to the top of the first kickup member 214.

Referring to FIGS. 5 and 6, the first kickup member 214 may have a generally inverted U-shaped cross-sectional shape or hat-shaped cross-sectional shape. As such, the first kickup member 214 can have a forward wall 274, a rearward wall 276, and a top wall 278 coupling the tops of the forward and rearward walls 274, 276 together. In one form, the first kickup member 214 is formed from a single piece of stamped sheet metal, though other configurations can be used such as multiple pieces welded together.

The tabs 254 can extend forward from the bottom of the forward wall 274 and rearward from the bottom of the rearward wall 276. A flange or tab 282-L can extend outboard from the left end of the top wall 278 to couple the first kickup member 214 to the left rocker panel 130-L. A flange or tab 282-R can extend outboard from the right end of the top wall 278 to couple the first kickup member 214 to the right rocker panel 130-R. Alternatively, or additionally, the tab 282-L can be coupled to the left forward portion 246-L and the tab 828-R can be coupled to the right forward portion 246-R.

In the example provided, a left end 284-L of the first kickup member 214 abuts the left forward portion 246-L and/or the left rocker panel 130-L, and may be welded thereto. Likewise, a right end 284-R of the first kickup member 214 abuts the right forward portion 246-R (FIG. 2) and/or the right rocker panel 130-R (FIGS. 2 and 3), and may be welded thereto. In an alternative configuration, not specifically shown, flanges or tabs (similar to tabs 282-L, 282-R, 254) may extend forward and/or rearward from the left and right ends 284-L, 284-R and be welded to the left and right forward portions 246-L, 246-R and/or the left and right rocker panel 130-L, 130-R.

As best shown in FIGS. 5 and 6, the first kickup member 214 may also define an aperture 288 to permit continuance of the drive shaft tunnel 238 (FIG. 4) under the first kickup member 214. Some of the tabs 254 may be coupled to (e.g., welded to) the drive shaft tunnel 238 (FIG. 4).

The second kickup member 218 is a structural member that spans the distance laterally between and is coupled to (e.g., welded to) the left and right rear rails 210-L, 210-R rearward of the first kickup member 214 to provide lateral structural strength and a lateral load path between the left and right rear rails 210-L, 210-R. The second kickup member 218 may be coupled to (e.g., welded) to the left and right rear rails 210-L, 210-R at a location that is proximate a meeting of the forward portions 246-L, 246-R with the transition portions 248-L, 248-R. As such, the second kickup member 218 may be coupled to (e.g., welded to) the left and right forward portions 246-L, 246-R and/or the left and right transition portions 248-L, 248-R.

In one form, the left end of the second kickup member 218 is coupled to (e.g., welded to) the left forward portion 246-L and the right end of the second kickup member 218 is coupled to (e.g., welded to) the right forward portion 246-R. The left end of the second kickup member 218 may also be coupled to (e.g., welded to) the left transition portion 248-L and the right end of the second kickup member 218 may also be coupled to (e.g., welded to) the right transition portion 248-R. In the example provided, the second kickup member 218 is not directly coupled to or welded to the rocker panels 130-L, 130-R.

The second kickup member 218 can be located in the longitudinal direction of the vehicle 10 aligned with the rearmost pillars or between the rear most pillars and the first kickup member 214. In the example provided, the second kickup member 218 is positioned partially aligned with and partially forward of the C-pillars 126-L, 126-R. In an alternative configuration, not specifically shown, the second kickup member 218 can be fully forward of the C-pillars 126-L, 126-R or can be fully aligned with or fully behind the C-pillars 126-L, 126-R.

Figure 7:
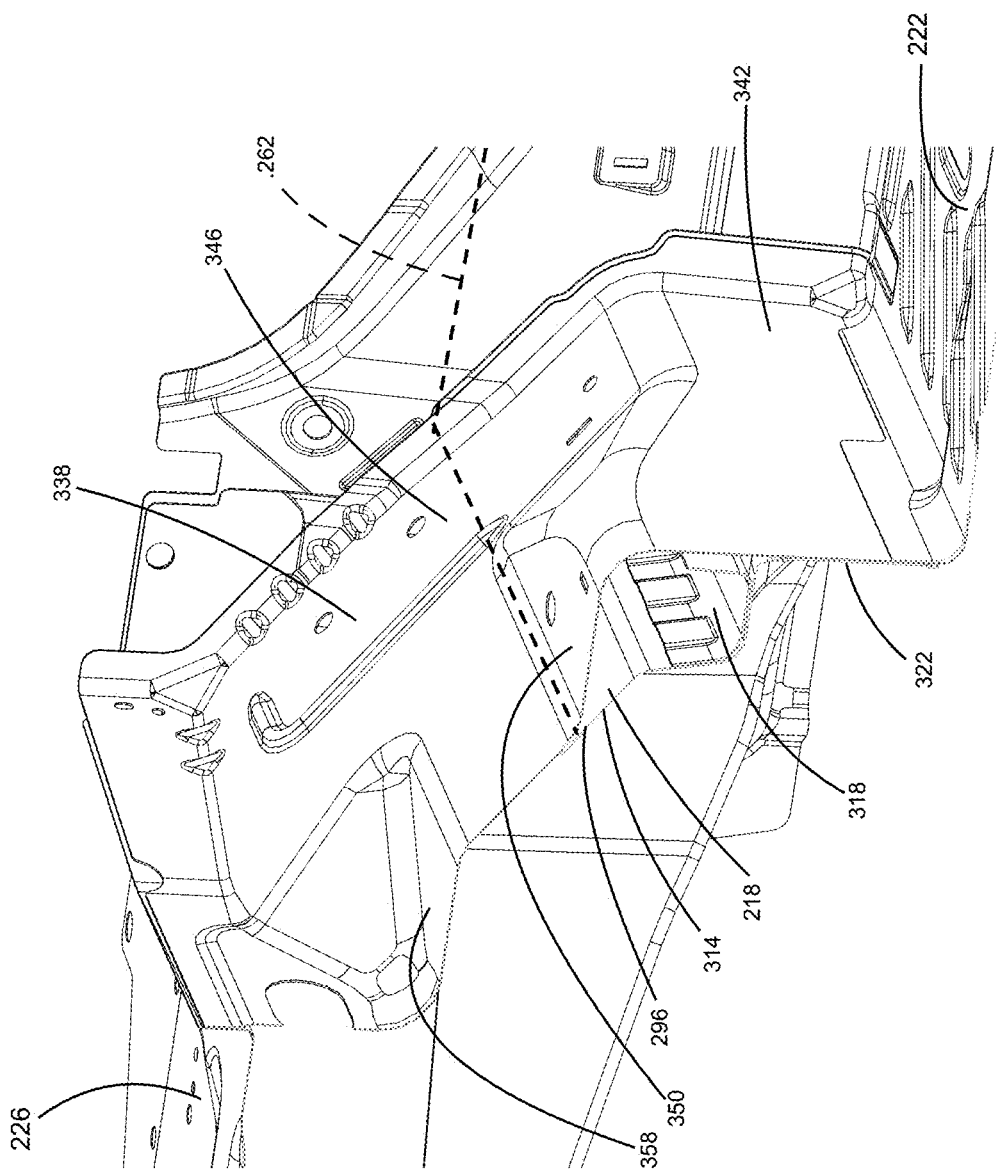
FIG. 7 is a cross-sectional perspective view of the second kickup member and the transitional floor panel of the unibody structure of FIG. 1.

The bottom of the second kickup member 218 is coupled to (e.g., welded to) the first floor panel 222 (shown in FIG. 4). In the example provided, the bottom of the second kickup member 218 includes a plurality of flanges or tabs 292 that are welded to the top or bottom of the first floor panel 222. The second kickup member 218 extends upward from the first floor panel 222 to the second floor elevation 262 (FIGS. 4 and 7). The second kickup member 218 may have a flange or tab 296 that angles rearward above the second floor level 262. The second kickup member 218 may also define an aperture 310 to permit continuance of the drive shaft tunnel 238 under the second kickup member 218.

In the example provided, the second kickup member 218 includes a main body 314 that is a single piece of stamped sheet metal and a reinforcement body 318 that is a second piece of stamped sheet metal welded to the main body 314 to reinforce the main body 314, though other configurations can be used, such as a single piece for the entire second kickup member 218 or additional pieces. The main body 314 includes a forward wall 322, a rearward wall 326 that is rearward of the forward wall 322, and a transverse wall 330 that extends between the bottom of the rearward wall 326 and the top of the forward wall 322.

In the example provided, the rearward wall 326 spans laterally between the left rear rail 210-L and the right rear rail 210-R. A flange or tab 334-L may extend forward from the left end of the rearward wall 326 and be coupled to (e.g., welded to) the left rear rail 210-L. A flange or tab 334-R may extend forward from the right end of the rearward wall 326 and be coupled to (e.g., welded to) the right rear rail 210-R. In the example provided, the forward wall 322 does not span completely across the lateral space between the left and right rear rails 210-L, 210-R. In the example provided, the forward wall 322 defines the aperture 310 and is coupled to (e.g., welded to) the drive shaft tunnel 238.

In the example provided, the reinforcement body 318 can have a generally U-shaped cross-sectional shape and be positioned above the forward wall 322 and forward of the rearward wall 326. The bottom of the U-shape can be coupled to (e.g., welded to) the transverse wall 330 and one leg of the U-shape can be coupled to (e.g., welded to) the rearward wall 326.

In the example provided, the tab 296 extends upward and rearward from the top of the rearward wall 326. Referring to FIG. 7, the forward wall 322 and reinforcement body 318 may be disposed below the second floor elevation 262. In the example provided, the tab 296 starts below the second floor elevation 262 and extends above it, though other configurations can be used.

Referring to FIGS. 4 and 7, a transitional floor panel 338 spans from the rear floor panel 226 generally forward and down to at least the second floor elevation 262. In the example provided, the transitional floor panel 338 may extend forward and down such that it is coupled to (e.g., welded to) the first floor panel 222. A rear side of the transitional floor panel 338 may contact and be coupled to (e.g., welded to) a forward side of the second kickup member 218. In the example provided, the rear side of the transitional floor panel 338 is coupled to (e.g., welded to) the forward side of the tab 296 and the forward side of the forward wall 322.

The transitional floor panel 338 includes a riser portion 342, an angled portion 346 and a platform portion 350. The riser portion 342 may be substantially vertical and rise from the first floor panel 222 to the platform portion 350. The platform portion 350 is disposed substantially horizontally at the second floor elevation 262 and can be configured to support and the rear seats 118 (FIG. 1) mounted thereto. Brackets 354 (FIG. 5) may extend from the tab 296 (FIG. 5) under the platform portion 350 and be configured to be mounted to by the seats 118 (FIG. 1), such as by threaded fasteners (not shown) for example. The angled portion 346 extends at an angle upward and rearward from the platform portion 350 and the riser portion 342 and is coupled to the rear floor panel 226.

A second floor panel (not shown) of sheet metal material may optionally be supported by the first kickup member 214 and the transitional floor panel at the second floor elevation 262.

The transitional floor panel 338 may include additional platform portions, such as platform portion 358, disposed above the platform portion 350.

The structural members, (e.g., the left and right rear rails 210-L, 210-R, the first kickup member 214, the second kickup member 218, the rear cross-members 234, the forward cross-members 230, the left and right rocker panels 130-L, 130-R, and the left and right pillars 122-L, 124-L, 126-L, 122-R, 124-R, 126-R) are formed from sheet metal having a thickness of greater than or equal to 1.2 millimeters (e.g., 18 gauge). The non-structural panels (e.g., the first floor panel 222, the rear floor panel 226, and the transition floor panel 338) are formed from sheet metal having a thickness of less than or equal to 0.7 millimeters (e.g., 22 gauge).

While the specific geometry of one example of the first and second kickup members 214, 218 are described herein and shown in the drawings, other geometries may be used that provide a structural load path laterally across the vehicle 10 while providing the elevation for the second floor elevations 262 and permitting transitioning from the second floor elevation 262 to the third floor elevation 266.

While welding is referred to herein, it is understood that other methods of fastening may be used where suitable, such as bolts or rivets for example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle of unibody construction comprising:
a unibody structure including:
a left rail including a left forward portion, a left rear portion, and a left transition portion, the left rear portion being higher than the left forward portion and inboard of the left forward portion, the left transition portion extending inboard and upward from the left forward portion to the left rear portion to connect the left forward portion to the left rear portion;
a right rail including a right forward portion, a right rear portion, and a right transition portion, the right rear portion being higher than the right forward portion and inboard of the right forward portion, the right transition portion extending inboard and upward from the right forward portion to the right rear portion to connect the right forward portion to the right rear portion;
a first kickup member, wherein a left end of the first kickup member is coupled to the left forward portion and a right end of the first kickup member is coupled to the right forward portion; and
a second kickup member that is rearward of the first kickup member, wherein a left end of the second kickup member is coupled to at least one of the left forward portion and the left transition portion, wherein a right end of the second kickup member is coupled to at least one of the right forward portion and the right transition portion;
a rear floor panel located above and rearward of the second kickup member; and
a transitional floor panel that spans in a lateral direction of the vehicle from the left rail to the right rail and spans from the rear floor panel forward and downward to the second kickup member, a rear side of the transitional floor panel being coupled to a forward side of the second kickup member.

2. The vehicle according to claim 1, wherein the first kickup member is located at a position in the vehicle where a floor of the vehicle transitions from a first elevation to a second elevation, the second elevation being higher than the first elevation, wherein the second kickup member is located a position in the vehicle where the floor of the vehicle transitions from the second elevation to a third elevation, third elevation being higher than the second elevation.

3. The vehicle according to claim 2, wherein the vehicle is a truck and the third elevation includes a truck bed of the vehicle.

4. The vehicle according to claim 2, wherein the first elevation includes a footwell of a passenger compartment and a seat of the vehicle is supported at the second elevation.

5. The vehicle according to claim 4, wherein the footwell is a rear footwell and the seat is a rear seat of the vehicle.

6. The vehicle according to claim 1, wherein the unibody structure further includes a left rocker panel and a right rocker panel, wherein the left end of the first kickup member is welded to the left rocker panel and to the left forward portion, wherein the right end of the first kickup member is welded to the right rocker panel and to the right forward portion.

7. A vehicle of unibody construction comprising:
a unibody structure including:
a left rail including a left forward portion, a left rear portion, and a left transition portion, the left rear portion being higher than the left forward portion and inboard of the left forward portion, the left transition portion extending inboard and upward from the left forward portion to the left rear portion to connect the left forward portion to the left rear portion;

a right rail including a right forward portion, a right rear portion, and a right transition portion, the right rear portion being higher than the right forward portion and inboard of the right forward portion, the right transition portion extending inboard and upward from the right forward portion to the right rear portion to connect the right forward portion to the right rear portion;

a first kickup member, wherein a left end of the first kickup member is coupled to the left forward portion and a right end of the first kickup member is coupled to the right forward portion; and a second kickup member that is rearward of the first kickup member, wherein a left end of the second kickup member is coupled to at least one of the left forward portion and the left transition portion, wherein a right end of the second kickup member is coupled to at least one of the right forward portion and the right transition portion, wherein the left end of the second kickup member is welded to the left forward portion, wherein the right end of the second kickup member is welded to the right forward portion.

8. The vehicle according to claim 7, wherein the left end of the second kickup member is welded to the left transition portion, wherein the right end of the second kickup member is welded to the right transition portion.

9. The vehicle according to claim 1, wherein the left end of the second kickup member is welded to the left transition portion, wherein the right end of the second kickup member is welded to the right transition portion.

10. The vehicle according to claim 1, wherein the left forward portion is substantially parallel to the right forward portion, wherein the left rear portion is substantially parallel to the right rear portion.

11. The vehicle according to claim 1, wherein the left transition portion is wider in the lateral direction of the vehicle proximate the left forward portion than proximate the left rear portion, wherein the right transition portion is wider in the lateral direction of the vehicle proximate the right forward portion than proximate the right rear portion.

12. The vehicle according to claim 11, wherein the left transition portion is wider in a vertical direction of the vehicle proximate the left forward portion than proximate the left rear portion, wherein the right transition portion is wider in the vertical direction of the vehicle proximate the right forward portion than proximate the right rear portion.

13. The vehicle according to claim 1, wherein the left transition portion is wider in a vertical direction of the vehicle proximate the left forward portion than proximate the left rear portion, wherein the right transition portion is wider in the vertical direction of the vehicle proximate the right forward portion than proximate the right rear portion.

14. The vehicle according to claim 1, wherein the first kickup member and the second kickup member are each configured to provide a structural load path between the left and right rails.

15. The vehicle according to claim 1, wherein the left forward portion is coupled to a left rocker panel of the unibody structure and the right forward portion is coupled to a right rocker panel of the unibody structure.

16. The vehicle according to claim 1, wherein the first kickup member and the second kickup member are formed of sheet metal of greater than or equal to 1.2 millimeter in thickness.

17. A vehicle of unibody construction comprising:
a unibody structure including:
a left rail including a left forward portion, a left rear portion, and a left transition portion, the left rear portion being higher than the left forward portion and inboard of the left forward portion, the left transition portion extending inboard and upward from the left forward portion to the left rear portion to connect the left forward portion to the left rear portion;

a right rail including a right forward portion, a right rear portion, and a right transition portion, the right rear portion being higher than the right forward portion and inboard of the right forward portion, the right transition portion extending inboard and upward from the right forward portion to the right rear portion to connect the right forward portion to the right rear portion;

a left rocker panel coupled to the left front portion and extending forward therefrom;

a right rocker panel coupled to the right front portion and extending forward therefrom;

a first kickup member located at a position in the vehicle where a floor of the vehicle transitions from a first elevation to a second elevation, the second elevation being higher than the first elevation, wherein a left end of the first kickup member is welded to the left forward portion and a right end of the first kickup member is welded to the right forward portion; and a second kickup member that is rearward of the first kickup member and located at a position in the vehicle where the floor of the vehicle transitions from the second elevation to a third elevation, the third elevation being higher than the second elevation, wherein a left end of the second kickup member is welded to the left forward portion and the left transition portion, wherein a right end of the second kickup member is welded to the right forward portion and the right transition portion;

a rear floor panel located at the third elevation; and a transitional floor panel that spans in a lateral direction of the vehicle from the left rail to the right rail and spans from the rear floor panel forward and downward to the second elevation, a rear side of the transitional floor panel being coupled to a forward side of the second kickup member, wherein the first and second kickup members are each configured to provide a structural load path between the left and right rails.

18. The vehicle according to claim 17, wherein the left end of the first kickup member is welded to the left rocker panel and wherein the right end of the first kickup member is welded to the right rocker panel.

19. The vehicle according to claim 17, wherein the vehicle is a truck and the third elevation includes a truck bed of the vehicle, wherein the first elevation is a footwell of a passenger compartment of the vehicle and a seat of the vehicle is supported on the second elevation.

20. The vehicle according to claim 1, further comprising a first floor panel that spans in the lateral direction of the vehicle from the left rail to the right rail and spans from the first kickup member rearward to the second kickup member, wherein the first floor panel is coupled to the transitional floor panel at a location between the first and second kickup members.

* * * * *